United States Patent [19]
McLaughlin et al.

[11] Patent Number: 6,078,646
[45] Date of Patent: Jun. 20, 2000

[54] CALLER ID ACTIVATED TEST DEVICE FOR TESTING A TELEPHONE SUBSCRIBER LOOP/ACCESS LINE

[76] Inventors: Peter J. McLaughlin, 73 Carlton Ave., Unit A21, Port Washington, N.Y. 11050; Warren Schmitt, 3-45 1049$^{th}$ Pl., Whitestone, N.Y. 11357; Anthony M. Kolodzinski, 1035 Lakeshore Dr., Massapequa Park, N.Y. 11762

[21] Appl. No.: 09/400,956

[22] Filed: Sep. 22, 1999

[51] Int. Cl.$^7$ ............................... H04M 1/24; H04M 1/56
[52] U.S. Cl. ................................. 379/27; 379/29; 379/21; 379/1; 379/142
[58] Field of Search ................................. 379/142, 93.17, 379/93.24, 1, 6, 5, 29, 27, 21, 22, 26, 9, 10

[56] References Cited

U.S. PATENT DOCUMENTS

| | | |
|---|---|---|
| 5,146,490 | 9/1992 | Beckman . |
| 5,652,782 | 7/1997 | Hughes-Hartogs ........................ 379/27 |
| 5,726,972 | 3/1998 | Ferguson ..................................... 379/1 |
| 5,790,634 | 8/1998 | Kinser, Jr. et al. . |
| 5,857,011 | 1/1999 | Kennedy et al. . |
| 5,901,201 | 5/1999 | Schull ........................................ 379/29 |
| 5,912,946 | 6/1999 | Michelson .................................. 379/1 |
| 5,937,033 | 8/1999 | Bellows ..................................... 379/29 |
| 5,937,034 | 8/1999 | Kennedy et al. .......................... 379/21 |
| 5,940,473 | 8/1999 | Lee ............................................. 379/29 |
| 5,943,391 | 8/1999 | Nordling .................................... 379/29 |
| 5,974,115 | 10/1999 | Chan et al. ................................. 379/29 |
| 5,982,851 | 11/1999 | Kennedy et al. .......................... 379/27 |
| 6,002,746 | 12/1999 | Mulcahy et al. ........................... 379/29 |
| 6,005,921 | 7/1997 | Keefe et al. .............................. 379/142 |

*Primary Examiner*—Curtis A. Kuntz
*Assistant Examiner*—Rexford Barnie
*Attorney, Agent, or Firm*—Collard & Roe, P.C.

[57] ABSTRACT

The invention relates to a device and a method for testing of telephone a subscriber loop/access line using a central test head and a series of remote test devices. In this case, the test head sends a telephone call to a remote test device, the test device contains a caller identification circuit and micro controller designed to recognize telephone calls from the test head. Therefore, when this remote test device receives this call, it disconnects an attached telephone and it signals a test and measurement circuit to start conducting a test(s) with the test head. This series of tests could be used, as an example, to determine whether there is excessive circuit loss, C-notched noise, C message weighted noise or 3 Khz flat noise on a subscriber loop/access line. This testing device could save an access provider from having to send a representative to the customer/subscriber locations to test the subscriber loop/access line.

16 Claims, 4 Drawing Sheets

CALLER ID ACTIVATED TEST DEVICE FOR TESTING A TELEPHONE SUBSCRIBER LOOP/ACCESS LINE

BACKGROUND OF THE INVENTION

1. Field of the Invention

The invention relates to a testing device for testing of a telephone subscriber loop/access line using Caller Identification (CID) Activation.

2. Description of the Prior Art

Various telephone line testing devices are known in the art. For example, U.S. Pat. No. 5,857,011 to Kennedy et al. Discloses a Multi-port caller ID based telephone ringback test device. This multi-port Caller ID based test unit is installable in the central office of a public switched telephone network. The test unit is capable of determining the telephone number, subscriber name and various other information associated with the subscriber line used to access the test device. These tests include exercising a caller identification, call waiting class of service, testing the ability of the telephone circuit to receive incoming calls, and testing the operation of a message waiting indicator of a telephone unit coupled to the telephone circuit.

U.S. Pat. No. 5,790,634 to Kinser Jr. et al. discloses a combination system for pro actively and reactively maintaining the working status of customer network facilities in response to customer request reporting a customer trouble The combined maintenance system includes an attendant station receiving the customer request and representing a reactively determined trouble. This station builds a first trouble report, and a first and second test systems. The first test system tests a second communication line in the communication cable representing a potentially pro actively determined trouble and builds a second trouble report. The second test system tests at least one of the first and second communication lines and determines whether at least one of the first and second trouble reports should be dispatched to a customer work group together with existing related pro active and reactive trouble reports to the customer work group using trouble routing criteria.

Finally, U.S. Pat. No. 5,146,490 to Beckman discloses a passive telephone line monitor for keeping a log of telephone line activity of both incoming and outgoing calls with a microcomputer. This microcomputer is controlled by an onboard program read only memory (ROM).

The present invention differs from the prior art because the present invention is related to a subscriber loop/access line testing device that is activated by unique caller identification CID(s) to perform tests. As an example, these tests include testing the transmission quality of a subscriber loop/access line.

SUMMARY OF THE INVENTION

One object of the invention is to provide a subscriber loop/access line testing device that has caller identification (CID) activation.

Another object of the invention is to provide a test device that incorporates test and measurement functions that has CID activation.

These and other objects are achieved through a subscriber loop/access line testing device for testing a subscriber loop/access line from a central office to a remote telephone. This central office has caller identification delivery capability, so that it can identify calls from a particular remote telephone. Connected through a subscriber loop/access line, at the customer/subscriber location the test device is activated using caller identification. In addition, a micro controller disposed within this testing device controls test and measurement and other circuitry disposed within the testing device. Thus, a call initiated from the test head to a remote telephone activates this micro controller (when the micro controller recognizes a unique CID) which in turn activates the selected test and measurement function from the test device to the test head. In this case, the test head is designed to connect to, and test multiple subscriber loop/access lines with test devices installed on them.

An example of the tests that can be performed using the test device can consist of one or more of the following: transmitting a 1004 Hz signal at −10 dbm and 600 ohms; transmitting a 404 Hz signal at −10 dbm and 600 ohms; transmitting a 2804 Hz signal at −10 dbm at 600 ohms; and finally, providing a quiet termination of 600 ohms. The testing device will also provide other standard telephone industry tests.

In the example above, a series of tests are conducted so that the following measurements can be made on a subscriber loop/access line: 1) circuit loss @ 1004 Hz, 2) C-notched noise @ 1004 Hz; 3) Circuit Loss @ 404 Hz; Circuit Loss @ 2804 Hz; 4) C message-weighted noise; and 4) 3-Khz flat noise. With these tests it is possible to determine whether a telephone line is working properly without the need to send an Access Provider Company representative out to a remote telphone.

BRIEF DESCRIPTION OF THE DRAWINGS

Other objects and features of the present invention will become apparent from the following detailed description considered in connection with the accompanying drawings that disclose one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENT

Figure 1:
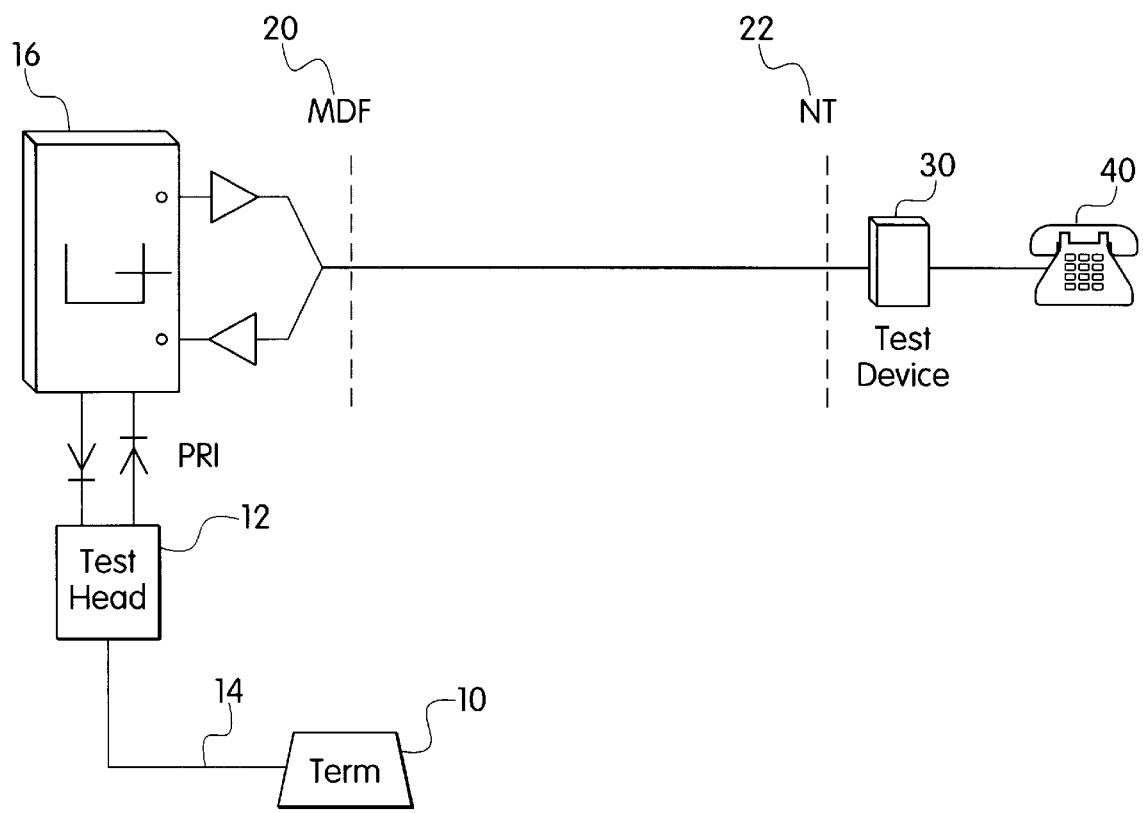
FIG. 1 is a block diagram of the test device for use on a subscriber loop/access line with the test head located on the serving central office switch.

Referring to the drawings, FIG. 1 shows a schematic overview of the invention wherein a terminal 10 is connected to a test head 12 via telecommunication line 14. Test head 12 is connected to a central office 16 having caller ID delivery capabilities. This central office 16 sends a signal through a main distribution frame 20 to a network termination 22.

Network termination 22, serves as a means to terminate the end of a public switched telephone network and connect it to a customer's location. In this case, test device 30 (See FIG. 2) attaches to this network termination 22 at one end and at another end test device 30 attaches to telephone 40.

In this embodiment, command signals are sent from terminal 10 to test head 12 over telecommunication line 14.

Figure 3A:
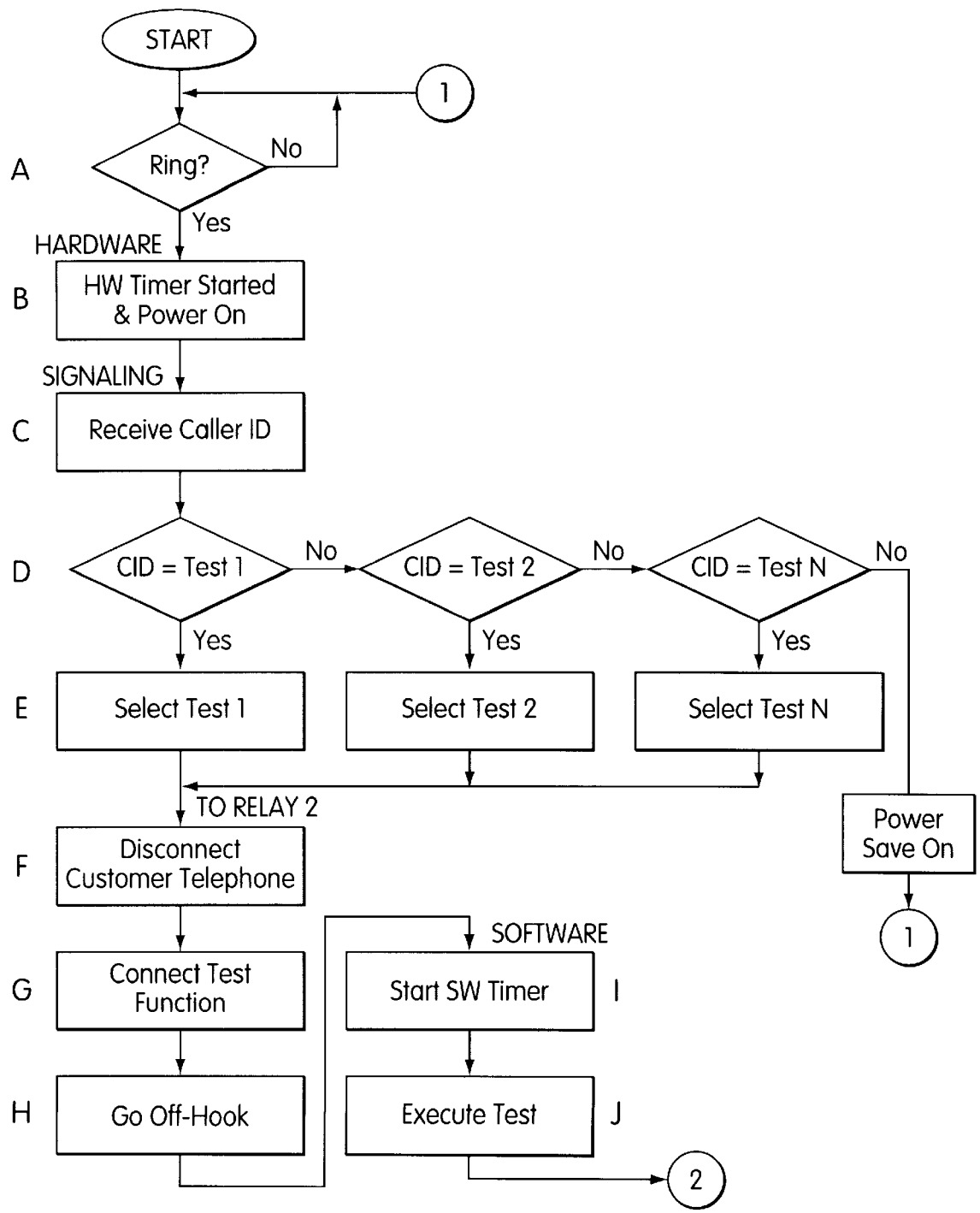
FIG. 3a is a functional flow diagram of the first half of the process of the telephone test device.
Figure 3B:
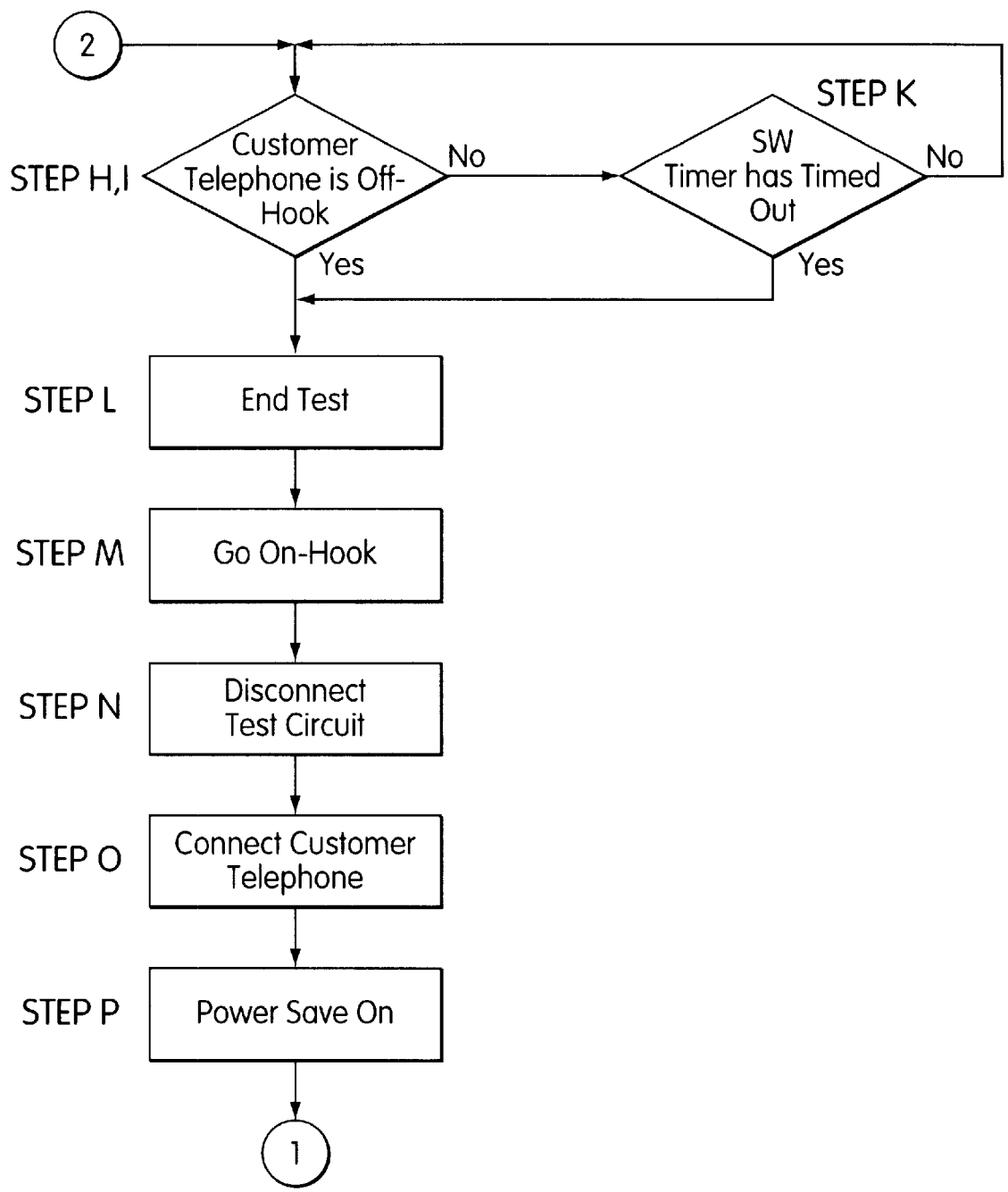
FIG. 3b is a functional flow diagram of the second half of the process of the telephone test device.

Test head 12 establishes a call through central office 16. Next, this call is sent through a main distribution frame 20 and on to test device 30. Test device 30 receives this signal and processes it as shown in FIG. 3a and 3b.

Figure 2:
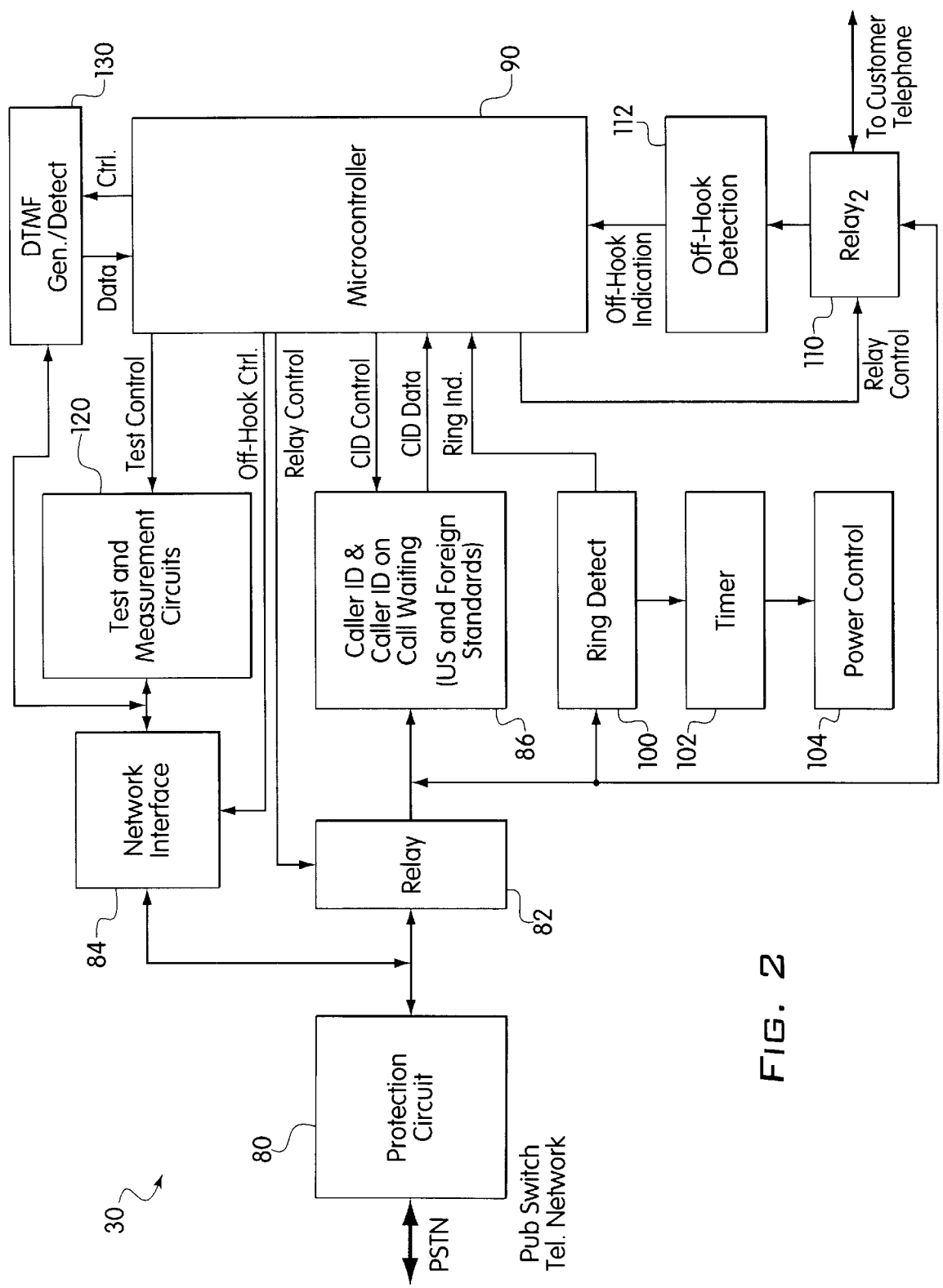
FIG. 2 is a block diagram of the test device; used for testing a subscriber loop/access line from a remote location.

FIG. 2 shows the block diagram for the test device 30. Test device 30 connects to a public switched telephone network through a protection circuit 80. Protection circuit 80 connects to a first relay 82 and to network interface circuit 84. First relay 82 is connected to caller identification circuit 86 and micro controller 90. In addition, connected to first relay 82 is ring detect circuit 100, wherein timer 102 and power control 104 are connected in series to ring detect 100. A second relay 110 also connects to first relay 82 wherein second relay 110 also connects to a remote telephone 40 and to an off hook detection indicator 112. Off hook detection indicator 112 is also connected to micro controller 90.

Finally, selectable test and measurements circuits 120 are connected to network interface 84 and to micro controller 90 while dual tone multiple frequency generator and detector 130 is connected to micro controller 90 and the network interface 84.

For example, terminal 10 sends a command to the test head 12 which in turn initiates a call to the network and on to the test device 30. This initiates the identification process. When a ring signal is detected in step A, shown in FIG. 3A ring detector 100 sends a signal to timer 102 in step B that next switches on power control 104 in step B.

Next, ring detector 100 sends a ring indication signal to micro controller 90. Micro controller 90 signals caller ID 86 to receive the call from relay 82 in step C. Next, in step D micro controller 90 runs a series of tests, testing the caller identification of the call. This information is sent back between caller ID 86 and micro controller 90. Next, in step E, micro controller 90 selects the test that matches with the CID sent from test head 12.

Next, in step F, after micro controller 90 recognizes the appropriate CID and selects a test, it sends a signal to a second relay 110 that disconnects customer telephone 40. However, if the CID is not recognized, then power control 104 is turned off, allowing the call to be passed to the subscriber telephone 40.

Once the test is selected in step E, in step F, second relay 110 disconnects customer telephone 40 so that the test is conducted between test and measurement circuitry 120 and test head 12. Next in step G the test function is started through test and measurement circuit 120. In step H, test device 30 goes off hook, and in step I a software timer is started, so that in step J, the line test is conducted. In step J, test and measurement circuitry 120 conducts the selected test with test head 12 across the public switched telephone network. To limit the length of this test, the software timer in step I sets a time limit for these tests.

For example, the types of testing that can occur, but not limited to, are as follows: First, test box 30 will transmit a series of signals to test head 12 in the following programmed sequence: a) transmit 1004 Hz @ −10 dbm, 600 ohms for 10 seconds; b) transmit 404 Hz @ −10 dbm 600 ohms for 10 seconds; c) transmit 2804 Hz @ −10 dbm 600 ohms for 10 seconds; d) provide a quite termination of 600 ohms for 10 seconds; e) hang up or terminate the test call.

During this series of testing, the test head or testing apparatus will measure and record the received signals from test device 30. These measurements can be used to derive the following information regarding the telephone line and overall connection from the test head to the test device: a) circuit loss @ 1004 Hz; b) C-notched Noise @ 1004 HZ; c) circuit loss @ 404 Hz; d) circuit loss @ 2804 Hz; e) C message weighted noise; and f) 3 Khz flat noise. Thus, in this example, this invention is an improvement because it tests the quality of a transmission over a telephone line by actuating and controlling a test device located at a customer's location.

In addition, a dual tone multiple frequency generator and detector (DTMF) 130 connected to micro controller 90 is able to send and receive DTMF signals from test head 12 after the test device 30 receives and recognizes the unique CID. In this process, signals are sent from DTMF generator/detector 120 through the network interface 84 and protection circuit 80.

Next, the signal goes from protection circuit 80 to test head 12. Test head 12 can also send DTMF signals back to DTMF generator/detector 130 wherein DTMF generator/detector 130 reads these instructions and sends the information on to the micro-controller 90. Through this line of communication, test head 12 and test device 130 can communicate with each other to perform additional functions such as, but not limited to: updating the firmware of the test device, and transmitting test results from the test device to the test head.

To prevent any inconvenience between prospective callers and the testing function, FIG. 3b shows a series of steps for stopping the test once a telephone receiver 40 has been picked up or the software timer 102, times out. Starting with steps H and I, a customer telephone 40 is on hook and the software timer 102 is running (step K). However, if the software timer 102 times out, or a customer telephone 40 goes off hook, the process next moves to step L. Next, test circuit 120 is disconnected in step M. In step N, customer telephone 40 is reconnected, and the power save mode in power control 104 is turned on. In this way, and with these steps, a customer can then use the telephone without being interrupted by a series of tests.

While one embodiment of the present invention has been shown and described, it is to be understood that many changes and modifications may be made thereunto without departing from the spirit and scope of the invention as defined in the appended claims.

What is claimed is:

1. A testing device for testing the subscriber loop/access line from a central office to a remote telephone comprising:
   a central terminal;
   a test head connected to said central terminal via a communication access line or system;
   a central office connected to said test head, said central office having caller identification delivery capability;
   a remote testing device connected to the subscriber loop access line and the remote telephone wherein said testing device is activated using caller identification;
   a micro controller disposed within said testing device;
   at least one test and measurement circuit disposed within said testing device and connected to said micro controller wherein upon a call from said test head to a remote telephone, said call activates said micro controller which in turn activates said test and measurement circuitry and other circuits to conduct a series of tests from said test device to said test head.

2. The subscriber loop/access line testing device as claimed in claim 1, wherein said test head is designed to connect to, and test multiple remote telephone lines.

3. The subscriber loop/access line testing device as claimed in claim 1, wherein said test device further comprises a caller identification circuit connected to said micro controller wherein when said test head calls said remote test device, said caller identification circuit with the micro controller identifies the call as a test call thereby allowing the micro controller to signal said test and measurement circuit to conduct a test a with the test head.

4. A test device connected to a subscriber loop/access line for testing said subscriber loop/access line transmission qualities from a central office to said test device comprising:

a micro controller for controlling said test device;

a power source connected to said micro controller;

a set of caller identification circuitry connected to said micro controller to determine when a test head calls to test the subscriber loop/access line; and a test and measurement circuit connected to said micro controller wherein when said test device receives a call from said test head, said caller identification circuitry with the micro controller reads said caller identification; identifies that call as coming from said test head and the micro controller signals test and measurement circuit to conduct tests with the test head.

5. The test device as claimed in claim 4, wherein said test device further comprises a network interface connected to said test and measurement circuitry; a first relay connected to said caller identification system; a second relay connected to said micro controller wherein said test and measurement circuit starts testing said subscriber loop/access line, said second relay disconnects said customer telephone and said first relay isolates said test and measurement circuitry from said caller identification circuitry so that said tests can be conducted from said test and measurement circuitry through said network interface and on to said test head.

6. The test device as claimed in claim 4, further comprising a dual tone multiple frequency generator and detector (DTMF), connected to said micro controller and to said network interface so that communication signals can be sent between said micro controller, and said test head through said DTMF generator/detector and said network interface.

7. The test device as claimed in claim 4, further comprising a hardware timer connected to said ring detector wherein when a call comes in from said test head, said hardware timer starts to that it can set a limit on the amount of time for each test.

8. The test device as claimed in claim 4, further comprising an off hook detector, connected to said second relay and to said micro controller, wherein when a remote phone is taken off its hook during a line test, said off hook detector signals said micro controller to stop the testing and allow the telephone line to become free.

9. A method for testing the transmission quality of a subscriber loop/access line comprising the steps of:

a) dialing a remote telephone from a test head;

b) turning on a hardware timer and power in the test device;

c) receiving a call from the test head into the caller identification activated test device;

d) conducting a series of caller identification tests;

e) selecting at least one of said CID actuated test sequences;

f) disconnecting a customer telephone in response to said CID test selection;

g) connecting and turning on a test and measurement circuit; and h) sending a series of test signals to the test head to test the transmission quality of a subscriber loop/access line.

10. The method for testing the transmission quality of a subscriber loop/access line as claimed in claim 9, further comprising the step of:

starting a software timer to limit the amount of time required to test a subscriber loop/access line.

11. The method for testing the transmission quality of a subscriber loop/access line as claimed in claim 9 further comprising the steps of checking to see if the customer telephone is off hook; and if the customer telephone is found to be off hook, reconnecting the customer telephone and ending the test to allow the customer to engage in telephone utilization.

12. The method for testing the transmission quality of a subscriber loop/access line, as claimed in claim 9, wherein the step of sending a series of test signals including transmitting a 1004 Hz signal @ −10 dbm at 600 ohms.

13. The method for testing the transmission quality of a subscriber loop/access line, as claimed in claim 9, wherein the step of sending a series of test signals includes transmitting a 404 Hz signal @ −10 dbm at 600 ohms.

14. The method for testing the transmission quality of a subscriber loop/access line, as claimed in claim 9, wherein the step of sending a series of test signals includes transmitting a 2804 Hz signal at −10 dbm at 600 ohms.

15. The method for testing the transmission quality of a subscriber loop/access line, as claimed in claim 9, wherein the step of sending a series of test signals includes providing a quiet termination at 600 ohms.

16. A method for testing a subscriber loop/access line comprising the steps of:

a) dialing a remote caller identification activated test and measurement device;

b) conducting a series of caller identification actuated tests;

c) selecting at least one of said caller identification actuated test sequences;

d) connecting and turning on a test and measurement circuit; and e) conducting a series of preprogrammed test and measurement sequences between said remote caller identification actuated test and measurement device and a test head.

* * * * *